United States Patent
Boese et al.

(10) Patent No.: US 10,843,658 B2
(45) Date of Patent: Nov. 24, 2020

(54) SEAT SYSTEM FOR A MOTOR VEHICLE

(71) Applicant: Bayerische Motoren Werke Aktiengesellschaft, Munich (DE)

(72) Inventors: Andreas Boese, Graefelfing (DE); Matthias Franz, Groebenzell (DE); Harald Lathwesen, Mauern (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 86 days.

(21) Appl. No.: 16/366,289

(22) Filed: Mar. 27, 2019

(65) Prior Publication Data
US 2019/0217812 A1 Jul. 18, 2019

Related U.S. Application Data

(63) Continuation of application No. PCT/EP2017/074428, filed on Sep. 27, 2017.

(30) Foreign Application Priority Data

Sep. 29, 2016 (DE) .......................... 10 2016 218 795

(51) Int. Cl.
*B60R 22/20* (2006.01)
*B60R 22/24* (2006.01)
(Continued)

(52) U.S. Cl.
CPC .............. *B60R 22/20* (2013.01); *B60N 2/143* (2013.01); *B60R 22/023* (2013.01); *B60R 22/24* (2013.01); *B60N 2002/022* (2013.01)

(58) Field of Classification Search
CPC ....... B60R 22/20; B60R 22/023; B60R 22/24; B60R 2022/207; B60N 2/143; B60N 2/14;
(Continued)

(56) References Cited

U.S. PATENT DOCUMENTS

| 4,120,531 A | 10/1978 | Fefferman |
| 4,541,654 A * | 9/1985 | Jonasson ................. B60N 2/20 280/801.1 |

(Continued)

FOREIGN PATENT DOCUMENTS

| DE | 38 16 834 A1 | 11/1989 |
| DE | 699 19 919 T2 | 9/2005 |

(Continued)

OTHER PUBLICATIONS

International Search Report (PCT/ISA/210) issued in PCT Application No. PCT/EP2017/074428 dated Jan. 25, 2018 with English translation (four (4) pages).

(Continued)

*Primary Examiner* — Keith J Frisby
(74) *Attorney, Agent, or Firm* — Crowell & Moring LLP

(57) ABSTRACT

A seat system for a motor vehicle has at least one vehicle seat, which can be adjusted between a first position in the forward direction of travel of the motor vehicle, and a second position counter to the forward direction of travel of the motor vehicle. A safety belt device is provided to secure an occupant seated in the vehicle seat in the first and second position. An optimized system in terms of weight, complexity and manufacturing costs, has the safety belt device include a respective belt system, held on corresponding holding points on the motor vehicle body-in-white side, for the first and for the second position of the vehicle seat.

10 Claims, 1 Drawing Sheet

(51) Int. Cl.
  *B60N 2/14* (2006.01)
  *B60R 22/02* (2006.01)
  *B60N 2/02* (2006.01)

(58) Field of Classification Search
  CPC .... B60N 2/203; B60N 2/02; B60N 2002/022; B64D 11/0601
  USPC ........ 280/801.2, 808, 801.1, 807; 297/283.1, 297/283.2, 283.3, 383, 481
  See application file for complete search history.

(56) References Cited

U.S. PATENT DOCUMENTS

| | | |
|---|---|---|
| 4,919,488 A | 4/1990 | Deegener et al. |
| 6,065,776 A | 5/2000 | Toyota et al. |
| 2015/0343922 A1* | 12/2015 | Brannstrom ......... B60N 2/2842 224/585 |

FOREIGN PATENT DOCUMENTS

| | | |
|---|---|---|
| DE | 10 2014 214 364 A1 | 2/2016 |
| FR | 2 993 214 A1 | 1/2014 |
| WO | WO-2011110273 A1 * | 9/2011 ........... B60R 22/023 |

OTHER PUBLICATIONS

German-language Written Opinion (PCT/ISA/237) issued in PCT Application No. PCT/EP2017/074428 dated Jan. 25, 2018 (four (4) pages).

German-language Office Action issued in counterpart German Application No. 10 2016 218 795.3 dated Jul. 4, 2017 (five (5) pages).

* cited by examiner

SEAT SYSTEM FOR A MOTOR VEHICLE

CROSS REFERENCE TO RELATED APPLICATIONS

This application is a continuation of PCT International Application No. PCT/EP2017/074428, filed Sep. 27, 2017, which claims priority under 35 U.S.C. § 119 from German Patent Application No. 10 2016 218 795.3, filed Sep. 29, 2016, the entire disclosures of which are herein expressly incorporated by reference.

BACKGROUND AND SUMMARY OF THE INVENTION

The invention relates to a seat system for a motor vehicle.

A large number of seat systems with respective individual vehicle seats which can be positioned in a first and, respectively, second position both in and also counter to the forward direction of travel of the motor vehicle are already known from the field of motor vehicle construction. Movement between the two positions usually takes place by way of rotation of the vehicle seat about its vertical axis. A corresponding mechanism is provided in the region of the seat underframe for this purpose.

If seat systems of this kind were known predominantly from transporters, motorhomes or vans to date, the increasing autonomous driving of motor vehicles opens up the option of using seat systems of this kind specifically in other types of vehicles, in particular passenger cars, too. However, it should be noted in this case that, during travel in the position counter to the forward direction of travel of the motor vehicle, high force pulses which need to be absorbed act on the seat occupant and the vehicle seat in the event of an application of force due to an accident, in particular as a consequence of a frontal collision of the vehicle. This applies, inter alia, particularly to the safety belt device for restraining or securing the seat occupant. For this reason, safety belt devices which can be used counter to the forward direction of travel of the motor vehicle have to be able to absorb considerable forces.

If so-called integral seats in which the safety belt device is fastened solely to the vehicle seat are used in this case, very simple movement of the vehicle seat between the two positions is rendered possible, but the vehicle seat has to be designed to be very stiff and accordingly solid in this case in order to be able to also absorb the forces which are introduced by means of the safety belt device in the event of an application of force due to an accident. This has considerable disadvantages with respect to the weight, the complexity and the production costs of the respective vehicle seat of the seat system.

It is therefore an object of the present invention to provide a seat system which is optimized in terms of weight, complexity and production costs.

This and other objects are achieved by a seat system according to the invention having at least one vehicle seat which can be adjusted between a first position in the forward direction of travel of the motor vehicle and a second position counter to the forward direction of travel of the motor vehicle. As a result, the seat system can be used, for example, in autonomously drivable vehicles in which the vehicle seat can be positioned counter to the forward direction of travel of the motor vehicle even during travel. In order to be able to provide appropriate accident protection when traveling in this way counter to the forward direction of travel of the motor vehicle, the safety belt device also comprises, in addition to a belt system by which the associated seat occupant is secured in the first position in the forward direction of travel of the vehicle seat, a belt system by which the seat occupant is secured in the second position counter to the forward direction of travel of the vehicle seat. In this case, the respective belt system for the first and the second position of the vehicle seat is respectively held at corresponding holding points on the motor vehicle bodyshell (e.g., body-in-white).

This means that a respective belt system, which is held on the motor vehicle bodyshell, is provided for each of the two positions of the vehicle seat, by which belt system a seat occupant can be secured and restrained in the forward direction of travel and, respectively, counter to the forward direction of travel. On account of being held at corresponding holding points on the motor vehicle bodyshell, it is therefore possible, in comparison to holding on the motor vehicle seat, to design the vehicle seat in a relatively delicate, weight-effective and less complex manner, this being accompanied by a corresponding cost saving. Owing to the provision of respective belt systems for the first position and the second position of the vehicle seat in the forward direction of travel and, respectively, counter to the forward direction of travel, the seat occupant is secured in both positions or orientations at the same time.

Here, it should be considered as being included within the scope of the invention that the two belt systems in particular, but not necessarily, have to be different. Under certain circumstances, it would even be feasible to use just one belt system which is changed over in respect of connection or changed over in respect of construction depending on the respective position of the vehicle seat. However, two separate belt systems are preferably used.

In one advantageous refinement of the invention, the belt system for the second position of the vehicle seat is detachably held at at least one holding point on the motor vehicle bodyshell. As a result, it is possible to remove the belt system from the corresponding holding points when it is not in use. A solution of this kind comes into particular consideration in the case of a belt system which is held in the region of an A-pillar and is used when the vehicle seat is positioned in the second position in which the vehicle seat is arranged counter to the forward direction of travel, and can be removed when said vehicle seat is positioned in the first position in which the vehicle seat is arranged in the forward direction of travel, in order to thereby prevent the belt system from being arranged in a disruptive manner.

In this context, it has been found to be further advantageous when a belt deflector of the belt system for the second position of the vehicle seat is detachably held at the associated holding point on the motor vehicle bodyshell. A belt deflector of this kind is located, for example, on the A-pillar in the region of the field of view of the respective seat occupant and would be found to be disturbing by said seat occupant when sitting in the vehicle seat which is oriented in the forward direction of travel.

In a further refinement of the invention, this belt deflector and also a belt end fitting of the belt system for the second position of the vehicle seat are held at respectively associated holding points on the motor vehicle bodyshell in the region of an A-pillar. In this way, a front row of vehicle seats can be equipped in a particularly advantageous manner with a belt system which serves to restrain the seat occupant when the vehicle seat is arranged counter to the forward direction of travel.

Finally, in a further embodiment of the invention, provision is made for the belt system for the second position of the vehicle seat to be arranged in a concealed manner at least substantially in the region of an instrument panel when not in use. As a result, it is possible to accommodate the belt system in a non-disruptive manner when not in use, specifically in the case of a vehicle seat which is arranged in the forward direction of travel.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
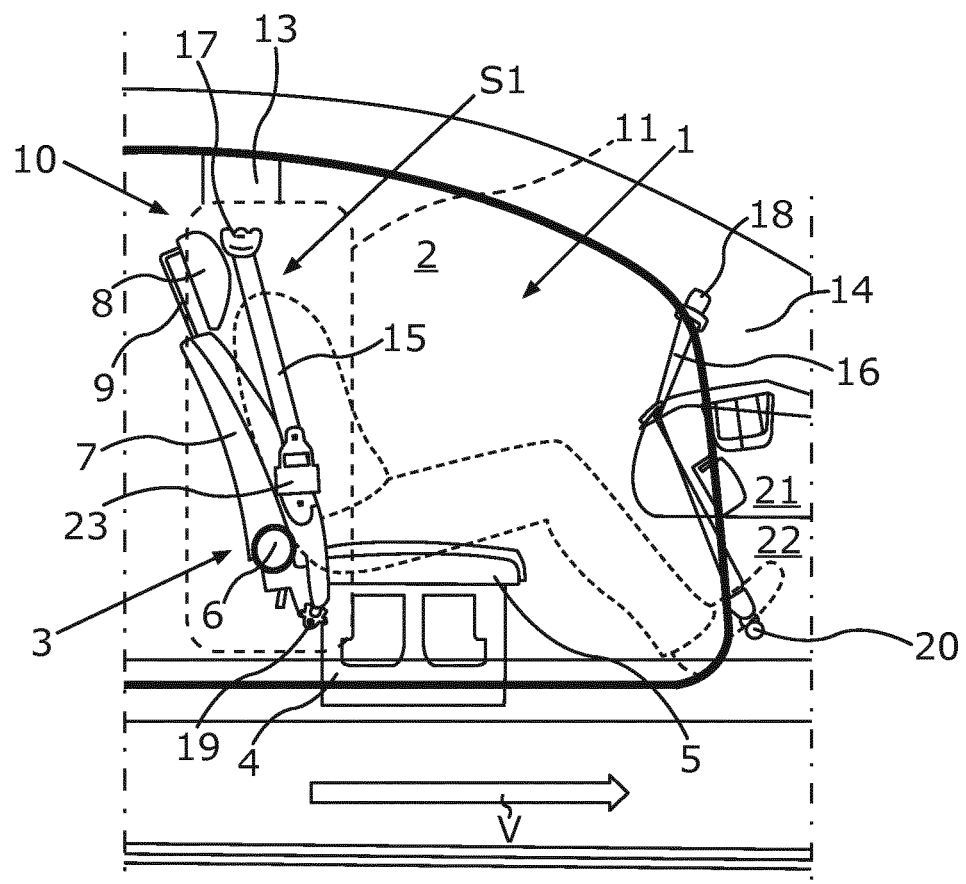
FIG. 1 is a schematic side view of a seat system for a passenger car, comprising a vehicle seat of a front row of vehicle seats, which vehicle seat is arranged in a first position in the forward direction of travel of the motor vehicle, and comprising a safety belt device which, for the first position of the vehicle seat, comprises a belt system which is held at corresponding holding points on the motor vehicle bodyshell and by which a seat occupant is secured in the first position of the vehicle seat.
Figure 2:
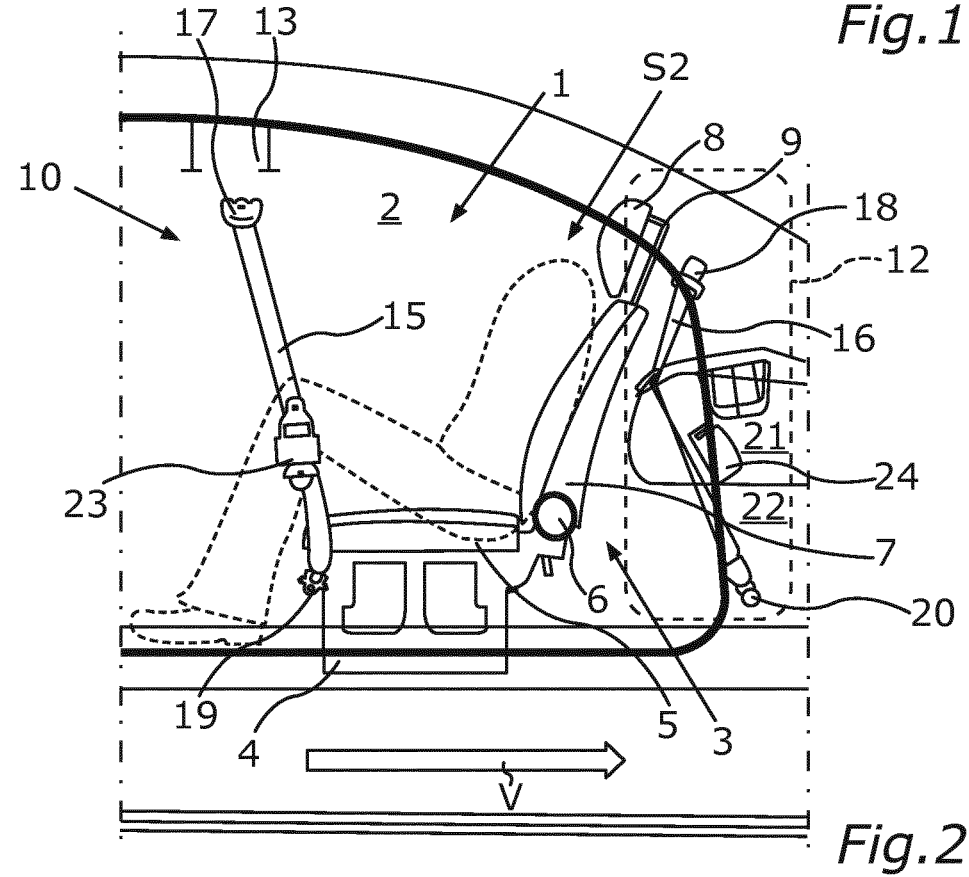
FIG. 2 is a schematic side view of the seat system according to FIG. 1, in which the vehicle seat is arranged in a second position counter to the forward direction of travel of the motor vehicle, and in which a further belt system of the safety belt device, which further belt system is held at corresponding holding points on the motor vehicle bodyshell, is provided for the second position of the vehicle seat, by which further belt system a seat occupant can be secured in the second position of the vehicle seat.

FIGS. 1 and 2 each show a schematic side view of a seat system 1 in an interior 2 of a passenger car. Here, the seat system 1 comprises respective vehicle seats 3 of a front row of vehicle seats, the left-hand-side seat—with respect to a forward direction of travel which is indicated by an arrow V—from amongst said seats being shown in the present case. However, in principle, the present invention can also apply to the right-hand-side seat and likewise to vehicle seats of a rear row of seats. In the present case, the vehicle seat 3 has a seat cushion part 5 which rests on a seat underframe 4, a backrest part 7 which is mounted on the seat underframe 4 and/or on the seat cushion part 5 by means of respective fittings 6, and also a head support 8 which is held in a vertically displaceable manner on the backrest part 7 by means of respective guide rods 9.

Looking at FIGS. 1 and 2 together shows that the vehicle seat 3 can be adjusted between a first position S1, illustrated in FIG. 1, in the forward direction of travel V of the motor vehicle and a second position S2, illustrated in FIG. 2, counter to the forward direction of travel V of the motor vehicle. This adjustment is performed, for example, by rotating the vehicle seat 3 through 180° about a rotation axis, which runs in the vertical direction of the vehicle, in the region of the seat underframe 4. The vehicle seat 3 is in the first position S1 in the forward direction of travel V of the motor vehicle during normal travel for example. The vehicle seat 3 is in the second position S2 counter to the forward direction of travel V of the motor vehicle during autonomous driving of the motor vehicle for example, so that the driver or passenger can sit counter to the forward direction of travel V in order to be able to better communicate with vehicle occupants in a rear row of vehicle seats for example.

Moreover, the seat system 1 comprises a safety belt device 10 which is provided for securing a schematically indicated seat occupant of the vehicle seat 3 in the first position S1 and in the second position S2. To this end, the safety belt device 10 comprises a respective belt system 11, 12 for the first position S1 and the second position S2 of the vehicle seat 3, said belt system being marked by a respective dashed line. Here, the belt system 11 serves to secure the seat occupant in the first position S1 of the vehicle seat 3 in the forward direction of travel V and is arranged substantially in the region of a B-pillar 13. The other belt system 12 serves to secure the seat occupant in the second position S2 of the vehicle seat 3 counter to the forward direction of travel V and is arranged substantially in the region of an A-pillar 14. Therefore, either one belt system 11 or the other belt system 12 is used, depending on the position S1 or S2 of the vehicle seat 3.

Each of these belt systems 11, 12 comprises a belt strap 15, 16 which can be wound up and, respectively, unwound in an automatic belt mechanism 23, 24. At the top end, the belt strap 15, 16 is deflected at an associated belt deflector 17, 18 and, at the bottom end, is fixed to a belt end fitting 19, 20. This means, in particular, that the respective belt strap 15, 16—with the associated belt deflector 17, 18 and the corresponding belt end fitting 19, 20—as corresponding holding points—is held on the motor vehicle bodyshell. Owing to the respective belt system 11, 12 being at least substantially attached to the motor vehicle bodyshell, for example the laterally associated A- or B-pillar 14, 13, forces which act on the seat occupant and therefore the respective belt system 11, 12 for example as a consequence of an application of force on the motor vehicle due to an accident, do not, for the most part, have to be absorbed by the vehicle seat 3 itself, but rather can be introduced into the motor vehicle bodyshell. In contrast to an integral seat with the safety belt device 10 integrated into the vehicle seat, relatively delicate and lightweight parts can therefore be used in the present vehicle seat 3, for example in the region of the seat cushion and backrest frame or in the region of the seat fittings.

The belt system 12 for the second position S2 of the vehicle seat 3 according to FIG. 2 is detachably held by use of a plug-type lock in the A-pillar 14 in the region of its one holding point on the motor vehicle bodyshell, which holding point is formed by the belt deflector 18. If, for example, the vehicle seat 3 is set in the first position according to FIG. 1 (or accordingly positioned so as to face forward in the forward direction of travel V), the belt deflector 18 which is then not in use can accordingly be removed or fixed—to a further plug-type lock—at a another point, for example in the region of an indicated instrument panel 21 or below said instrument panel in a footwell 22. As a result, the seat occupant facing forward has a clear view without a disruptive belt strap 16 and a disruptive belt deflector 18. It goes without saying that the other holding points of the belt system 12 on the motor vehicle bodyshell could also be of removable design if desired in order to arrange said belt system in a concealed manner as far as possible when not in use. It would also be feasible to use only one belt system 11 or 12 and to fix said belt system either to the respective holding points in the region of the B-pillar 13 or the A-pillar 14—depending on the position S1 or S2 of the vehicle seat 3—in order to secure the seat occupant in the selected position S1 or S2 of the vehicle seat 3.

LIST OF REFERENCE SYMBOLS

1 Seat system
2 Interior

3 Vehicle seats
4 Seat underframe
5 Seat cushion part
6 Fittings
7 Backrest part
8 Head support
9 Guide rods
10 Safety belt device
11 Belt system
12 Belt system
13 B-pillar
14 A-pillar
15 Belt strap
16 Belt strap
17 Belt deflector
18 Belt deflector
19 Belt end fitting
20 Belt end fitting
21 Instrument panel
22 Footwell
23 Automatic belt mechanism
24 Automatic belt mechanism
V Forward direction of travel
S1 First position of the vehicle seat
S2 Second position of the vehicle seat The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A seat system for a motor vehicle, comprising:
   at least one vehicle seat which is adjustable between a first position in a forward direction of travel of the motor vehicle and a second position counter to the forward direction of travel of the motor vehicle;
   a safety belt device configured to secure an occupant seated in the vehicle seat in the first and the second position, wherein
   the safety belt device for the first and the second position of the vehicle seat comprises respective belt systems which are held at corresponding holding points on a vehicle bodyshell of the motor vehicle.

2. The seat system as claimed in claim 1, wherein
   the belt system for the second position of the vehicle seat is detachably held at at least one holding point on the vehicle bodyshell.

3. The seat system as claimed in claim 2, wherein
   a belt deflector of the belt system for the second position of the vehicle seat is detachably held on the vehicle bodyshell.

4. The seat system as claimed in claim 3, wherein
   the belt deflector and also a belt end fitting of the belt system for the second position of the vehicle seat are held on the vehicle bodyshell in a region of an A-pillar.

5. The seat system as claimed in claim 2, wherein
   the belt system for the second position of the vehicle seat is configured so as to be concealed at least substantially in a region of an instrument panel when not in use.

6. A motor vehicle, comprising:
   a vehicle bodyshell; and
   a seat system for the motor vehicle as claimed in claim 1.

7. The seat system as claimed in claim 6, wherein
   the belt system for the second position of the vehicle seat is detachably held at at least one holding point on the vehicle bodyshell.

8. The seat system as claimed in claim 6, wherein
   a belt deflector of the belt system for the second position of the vehicle seat is detachably held on the vehicle bodyshell.

9. The seat system as claimed in claim 6, wherein
   a belt deflector and also a belt end fitting of the belt system for the second position of the vehicle seat are held on the vehicle bodyshell in a region of an A-pillar.

10. The seat system as claimed in claim 6, wherein
    the belt system for the second position of the vehicle seat is configured so as to be concealed at least substantially in a region of an instrument panel when not in use.

\* \* \* \* \*